United States Patent [19]
Taira et al.

[11] Patent Number: 5,659,886
[45] Date of Patent: Aug. 19, 1997

[54] DIGITAL MOBILE TRANSCEIVER WITH PHASE ADJUSTING STRIP LINES CONNECTING TO A COMMON ANTENNA

[75] Inventors: Noriaki Taira; Minoru Sakata, both of Kawasaki, Japan

[73] Assignee: Fujitsu Limited, Kanagawa, Japan

[21] Appl. No.: 573,721

[22] Filed: Dec. 18, 1995

Related U.S. Application Data

[63] Continuation of Ser. No. 210,237, Mar. 17, 1994, abandoned.

[30] Foreign Application Priority Data

Sep. 20, 1993 [JP] Japan .................... 5-233107

[51] Int. Cl.$^6$ .................................... H04B 1/46
[52] U.S. Cl. .................. 455/81; 455/82; 455/129; 455/269; 455/276.1; 370/294; 333/126; 333/132
[58] Field of Search ................... 455/73, 80, 82, 455/83, 84, 129, 269, 276.1, 277.1, 289, 280, 78, 79, 81, 75; 370/95.3, 294, 347, 442; 333/126, 129, 134, 132

[56] References Cited

U.S. PATENT DOCUMENTS

| | | | |
|---|---|---|---|
| 2,507,915 | 5/1950 | Lindenblad | 455/82 |
| 3,925,729 | 12/1975 | Amoroso . | |
| 3,931,575 | 1/1976 | Amoroso, Jr. | 455/75 |
| 4,186,344 | 1/1980 | Higuchi et al. . | |
| 4,361,904 | 11/1982 | Matsumura . | |
| 4,380,822 | 4/1983 | Broton | 455/83 |
| 4,792,939 | 12/1988 | Hikita et al. | 455/86 |
| 5,015,973 | 5/1991 | Kawakami et al. | 333/132 |
| 5,212,815 | 5/1993 | Schumacher | 455/80 |
| 5,276,914 | 1/1994 | Ishizuka et al. | 455/83 |
| 5,335,360 | 8/1994 | Marko et al. | 455/56.1 |

FOREIGN PATENT DOCUMENTS

| | | |
|---|---|---|
| 2538348 | 3/1976 | Germany . |
| 2755867 | 6/1978 | Germany . |
| 3028751 | 2/1981 | Germany . |
| 4219994 | 7/1993 | Germany . |

*Primary Examiner*—Reinhard J. Eisenzopf
*Assistant Examiner*—Doris To
*Attorney, Agent, or Firm*—Helfgott & Karas, P.C.

[57] ABSTRACT

In a digital mobile radio apparatus according to the present invention, a duplexer for connecting a transmitter and a receiver to a common receiving/transmitting antenna is constructed from an isolator and a receiving band-pass filter. The receiving band-pass filter prevents a transmitted wave from entering the receiver. Impedance matching is effected so that the isolator can prevent a received wave from entering the transmitter while suppressing the entrance of signals radiated from other mobile units in the same transmitting frequency band but at a different operating frequency.

3 Claims, 2 Drawing Sheets

5,659,886

DIGITAL MOBILE TRANSCEIVER WITH PHASE ADJUSTING STRIP LINES CONNECTING TO A COMMON ANTENNA

This is continuation, of application Ser. No. 08/210,237, filed Mar. 17, 1994 now abandoned.

BACKGROUND OF THE INVENTION

1. Field of the Invention

The present invention relates to a radio apparatus, and more particularly to a portable, compact digital mobile radio apparatus.

Car telephones and other mobile-portable telephones perform communication using allocated radio frequencies in the 800-MHz and 1.5-GHz bands. Going digital in these systems reduces the cost of base stations, and using a time-division multiple access (TDMA) technique, the allocated radio frequencies can be used efficiently. For such mobile radio communication systems, the need has been increasing to reduce the size and weight of digital mobile radio apparatus.

2. Description of the Related Art

In conventional mobile units for digital mobile radio communication, both the receiver and transmitter are connected to a receive/transmit common antenna via a transmitting band-pass filter and a receiving band-pass filter respectively. The transmitting band-pass filter permits signals only within the transmitting frequency band to pass through and thus keeps received waves from entering the transmitter, while the receiving band-pass filter permits signals only within the receiving frequency band to pass through and thus keeps transmitted waves from entering the receiver. Furthermore, in the transmitter unit, an isolator for limiting the passage of signals in only one direction is inserted between the transmitter and the transmitting band-pass filter, to prevent the entrance of electric waves radiated from other mobile units in the same frequency band but at a different operating frequency. The transmitting band-pass filter and receiving band-pass filter are each constructed from a dielectric filter or a surface acoustic wave filter.

Electronic circuitry for mobile radio communication equipment has been reduced in size and weight by using semiconductor integrated circuits. However, in prior art mobile radio communication apparatus, the transmitting band-pass filter and receiving band-pass filter are constructed from a dielectric filter, a surface acoustic wave filter, or the like, as noted above, but these components are difficult to fabricate as integrated circuits. This has placed a limitation on the reduction of the overall size.

SUMMARY OF THE INVENTION

It is an object of the present invention to provide a radio apparatus permitting a reduction in size and achieving a low-loss characteristic at the same time.

According to the present invention, there is provided a radio apparatus comprising: a common antenna used for both reception and transmission; a transmitter for feeding a transmit signal to the common receiving/transmitting antenna; a receiver for accepting a received signal received by the common receiving/transmitting antenna; an isolator, connected to the transmitter and directly coupled to the receiving/transmitting antenna, for selectively transmitting signals only in the direction from the transmitter to the common receiving/transmitting antenna; and a receiving band-pass filter, connected between the receiver and the common receiving/transmitting antenna, for permitting signals only within a receiving signal frequency band to pass through.

DESCRIPTION OF THE PREFERRED EMBODIMENT

Figure 1:
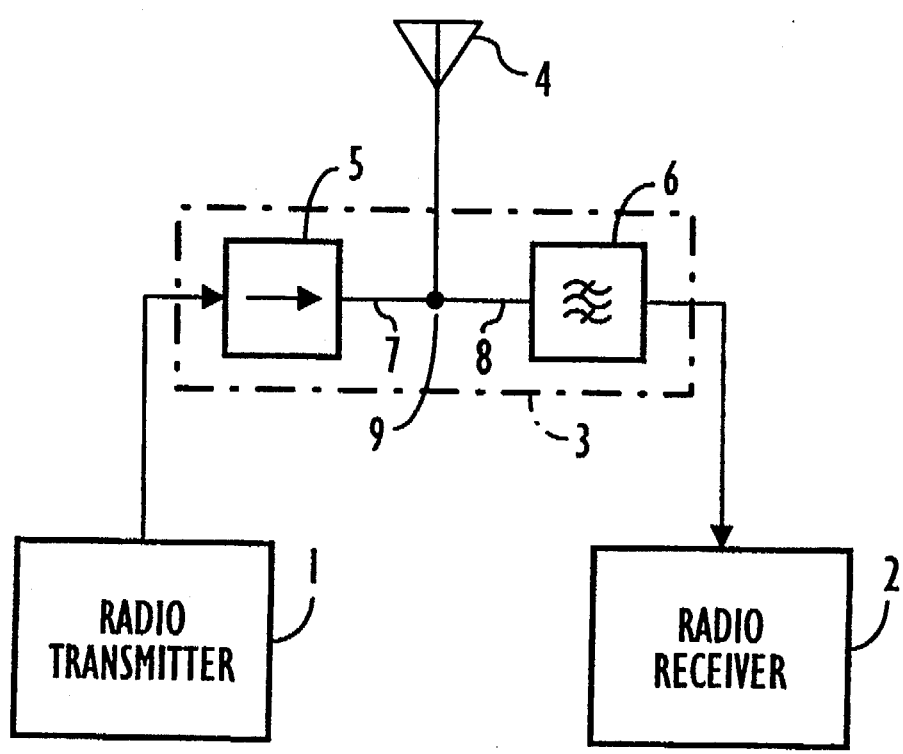
FIG. 1 is a block diagram showing the basic configuration of a radio apparatus according to the present invention.

FIG. 1 is a block diagram showing the basic configuration of a radio apparatus according to the present invention.

A radio transmitter 1 and a radio receiver 2 are connected to a common receiving/transmitting antenna 4 via a duplexer 3. The duplexer 3 comprises an isolator 5 for connecting the radio transmitter 1 to the common receiving/transmitting antenna 4, and a receiving band-pass filter 6 for connecting the radio receiver 2 to the common receiving/transmitting antenna 4.

The isolator 5 and receiving band-pass filter 6 in the duplexer 3 are connected to the antenna 4 via respective phase-adjusting strip lines 7, 8. The common connection between the antenna 4 and strip lines 7, 8 is at a diverging point 9.

In the radio apparatus of the invention, a transmitting band-pass filter such as used in the prior art is omitted; therefore, as compared to prior art radio apparatus, insertion loss due to the transmitting band-pass filter is eliminated, and the size of the apparatus can be reduced at the same time. Since the isolator 5 also has a characteristic that permits the transmission of signals of selected frequencies, desired spurious suppression can be obtained. More specifically, using the phase-adjusting strip lines 7, 8, impedances are matched between the antenna 4 and the isolator 5 for the transmitting frequencies, and between the antenna 4 and the receiving band-pass filter 6 for the receiving frequencies, so that the received wave can be prevented from entering the transmitter side.

Figure 2:
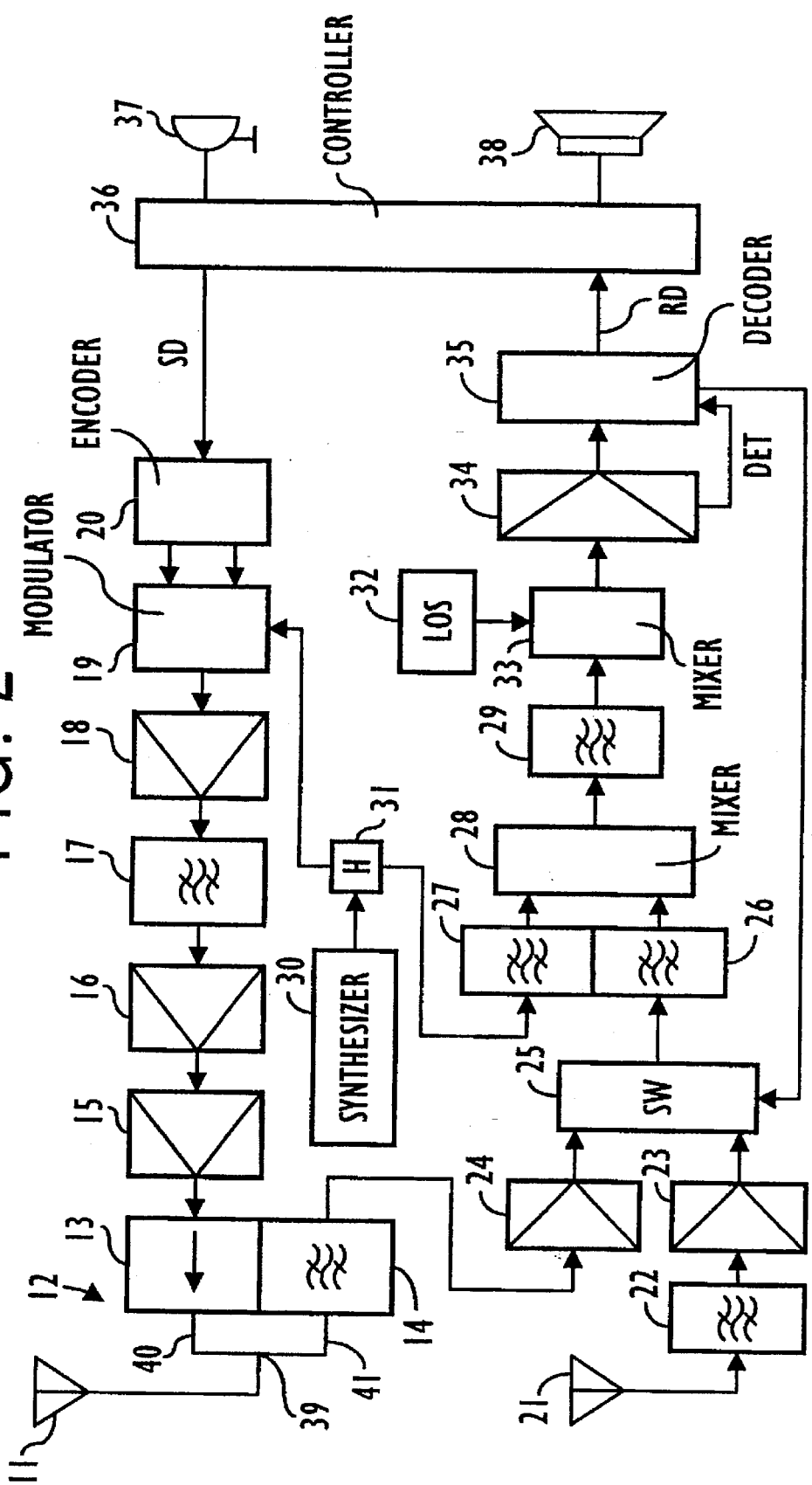
FIG. 2 is a block diagram of a digital mobile radio apparatus according to one embodiment of the invention.

FIG. 2 is a block diagram of a digital mobile radio apparatus according to one embodiment of the present invention. In the figure, the numeral 11 is a whip antenna; 12 is a duplexer; 13 is an isolator; 14 is a receiving band-pass filter; 15 is a transmission power amplifier; 16 and 18 are buffer amplifiers; 17 is a band-pass filter; 19 is a modulator; 20 is an encoder; 21 is a built-in antenna; 22 is a receiving band-pass filter; 23 and 24 are low-noise amplifiers; 25 is a diversity switch circuit; 26 and 27 are band-pass filters; 28 is a mixer; 29 is a band-pass filter; 30 is a frequency synthesizer; 31 is a hybrid circuit (H); 32 is a local oscillator (LOS); 33 is a mixer; 34 is an intermediate-frequency amplifier; 35 is a decoder; 36 is a controller; 37 is a microphone; and 38 is a speaker.

The duplexer 12 is constructed from the isolator 13 and receiving band-pass filter 14. In this duplexer 12, the transmitting band-pass filter used in the prior art radio apparatus is omitted and replaced by the isolator. The omission of the transmitting band-pass filter as used in the prior art contributes to reducing the size and weight of the apparatus. This also eliminates the insertion loss due to the transmitting band-passfilter.

In TDMA where different frequencies are used, and different time slots assigned, between reception and transmission, if a low-power transmitted signal enters the receiver via the receiving band-pass filter 14, this will have no effect on the received signal; likewise, if a low-power received signal enters the transmitter via the isolator 13, this will have no effect on the transmit signal. Furthermore, by taking into account various factors including the frequency and other characteristics of the transmission power amplifier 15, the isolator 13 can be easily constructed to have the desired frequency characteristics within the transmitting frequency range. Thus, the present embodiment is capable of sufficiently satisfying the frequency characteristics demanded of mobile radio apparatus, including the suppression of unwanted waves due to the transmission band-pass filter used in the prior art duplexer.

The isolator 13 and the receiving band-pass filter 14 are respectively connected at a diverging point 39 to the whip antenna 11 via strip lines 40, 41 whose lengths are respectively selected so as to match impedances between the whip antenna 11 and the isolator 13 for the transmitting frequencies and between the whip antenna 11 and the receiving band-pass filter 14 for the receiving frequencies.

When the transmitting frequencies allocated are in the 940- to 960-MHz range, the synthesizer 30 is constructed to output signals within this frequency range. When the receiving/transmitting frequencies and time slots are assigned from the base station, the output frequency of the synthesizer 30 is controlled via a control link not shown, so that the synthesizer 30 outputs a signal at the assigned frequency, the signal then being fed through the hybrid circuit 31 and on to the modulator 19 and band-pass filter 27.

When a radio communication loop to the base station is completed, the voice signal from the microphone 37 is converted by the controller 36 into a digital signal which is sent as send data SD. Alternatively, the signal is band-limited by the controller 36 using a high-efficiency encoding scheme, and is converted to send data SD, which is applied to the encoder 20 when a transmission time slot occurs.

If quadrature modulation is to be carried out in the modulator 19, the send data is serial-parallel converted by the encoder 20 so that I and Q channels can be produced. At the same time, the synthesizer 30 outputs a signal at the assigned transmitting frequency within the 940- to 960-MHz frequency range, and this signal is fed through the hybrid circuit 31 and on to the modulator 19 and also to the band-pass filter 27 having pass band frequencies of 940 to 960 MHz.

Thus, the send data SD is quadrature-modulated by the modulator 19 and fed to the transmission power amplifier 15 after being passed through the buffer amplifier 18, the band-pass filter 17 with pass band frequencies of 940 to 960 MHz, and the buffer amplifier 16 in this order. The send signal amplified by the transmission power amplifier 15 is fed to the isolator 13 in the duplexer 12, and then output on the whip antenna 11 for transmission to the base station.

When the receiving frequencies allocated are in the 810- to 830-MHz range, the signal received by the whip antenna 11 is applied to the low-noise amplifier 24 via the receiving band-pass filter 14 in the duplexer 12. This receiving band-pass filter 14 has a pass band of 810 to 840 MHz. On the other hand, the signal received by the receive-only built-in antenna 21 is applied to the low-noise amplifier 23 via the receiving band-pass filter 22 having a pass band of 810 to 830 MHz.

Output signals from the low-noise amplifiers 23 and 24 are supplied to the diversity switch circuit 25 which selects one or the other of the signals of output to the band-pass filter 26 having a pass band of 810 to 830 MHz. The received signal passed through the band-pass filter 26 is fed into the mixer 28, where the received signal is mixed with the output signal of the synthesizer 30 passed through the band-pass filter 27 having a pass band of 940 to 960 MHz. The resulting signal is passed on to the band-pass filter 29 having a center frequency of 130 MHz, to produce a first intermediate frequency signal.

The first intermediate frequency signal is fed into the mixer 33, where it is mixed with a locally generated signal of 129.545 MHz fed from the local oscillator 32. The result is a second intermediate frequency signal of 455 kHz. This signal is supplied to the intermediate-frequency amplifier 34. The intermediate-frequency amplifier 34 includes an AGC amplifying circuit and a multi-stage amplifying circuit containing an amplifier in combination with a band-pass filter having a center frequency of 455 kHz.

The output signal of the intermediate-frequency amplifier 34 is supplied to the decoder 35, while at the same time, a detection signal DET representing the received signal level detected in the AGC amplifying circuit, etc., is also applied to the decoder 35 from the intermediate-frequency amplifier 34. The received signal is thus decoded into receive data RD. On the other hand, in case the detection signal DET falls below a prescribed level, the diversity switch circuit 25 is controlled so that the whip antenna 11 or the built-in antenna 21, whichever is larger in terms of the received signal level, is switched in.

The receive data RD is fed into the controller 36 where it is converted into an analog voice signal for voice reproduction through the speaker 38.

For a duplexer for use in a digital mobile radio apparatus designed for operation at the transmitting frequencies of 940 to 960 MHz and receiving frequencies of 810 to 830 MHz, specifications with regard to the transmitting frequency band are provided, part of which are as follows. Maximum ripple within the transmitting frequency band: 0.60 dB; maximum VSWR: 1.80; and isolation at the frequencies 1880–1920 MHz and 2820–2880 MHz: 20 dB minimum.

By comparison, in the case of the prior art duplexer constructed from a transmitting band-pass filter and a receiving band-pass filter, the ripple within the transmitting frequency band was 0.06 dB, VSWR was 1.32 to 1.38, and the isolation at the frequencies 1880–1920 MHz and 2820–2880 MHz was 28.7 dB–30.0 dB and 25.1–26.0 dB, respectively.

On the other hand, for the duplexer 12 in the above embodiment of the invention, constructed from the isolator 13 and receiving band-pass filter 14, the ripple within the transmitting frequency band was 0.05 dB to 0.08 dB, VSWR was 1.29 to 1.45, and the isolation at the frequencies 1880–1920 MHz and 2820–2880 MHz was 35.8 dB–46.5 dB and 38.6 dB–58.3 dB, respectively. These characteristics more than satisfy the characteristics required by the specification.

As described above, according to the present invention, the duplexer 3 is constructed from the isolator 5 and receiving band-pass filter 6, and the transmitting band-pass filter used in the prior art is omitted. This contributes to reducing the size and weight of the apparatus. More specifically, when the invention is applied to TDMA where different frequencies and time slots are assigned between reception and transmission, the desired characteristics can be obtained despite the omission of the transmitting band-pass filter. Furthermore, the omission of the transmitting band-pass filter means the elimination of insertion loss due to the transmitting band-pass filter, the advantage being increased transmission power efficiency. It will further be noted that the reduced loss also contributes to reducing the size of the apparatus.

We claim:

1. A radio apparatus comprising:

a common antenna used for both reception and transmission;

a transmitter for feeding a transmit signal to said common receiving/transmitting antenna;

a receiver for accepting a signal received by said common receiving/transmitting antenna;

an isolator, connected to said transmitter and directly coupled to said common receiving/transmitting antenna through a direct connection point of transmission and reception signals via said common receiving/transmitting antenna, for selectively transmitting signals only in one direction from said transmitter to said common receiving transmitting antenna, and a receiving band-pass filter, connected between said receiver and said direct connection point connected with said receiving/transmitting antenna, for permitting signals only within a receiving signal frequency band to pass therethrough.

2. A radio apparatus according to claim 1, wherein said isolator and said common receiving/transmitting antenna are connected via a strip line having a length adjusted to attain impedance matching for the frequency of a transmitted wave, and said receiving band-pass filter and said common receiving/transmitting antenna are connected via a strip line having a length adjusted to attain impedance matching for the frequency of a received wave.

3. A radio apparatus according to claim 1, whereby communication is performed using a time-division multiple access method in which a transmitted wave and a received wave are assigned different frequencies.

* * * * *